Feb. 26, 1924.
W. J. CARPENTER
SWAB
Filed Jan. 24, 1923
1,485,248
2 Sheets-Sheet 2
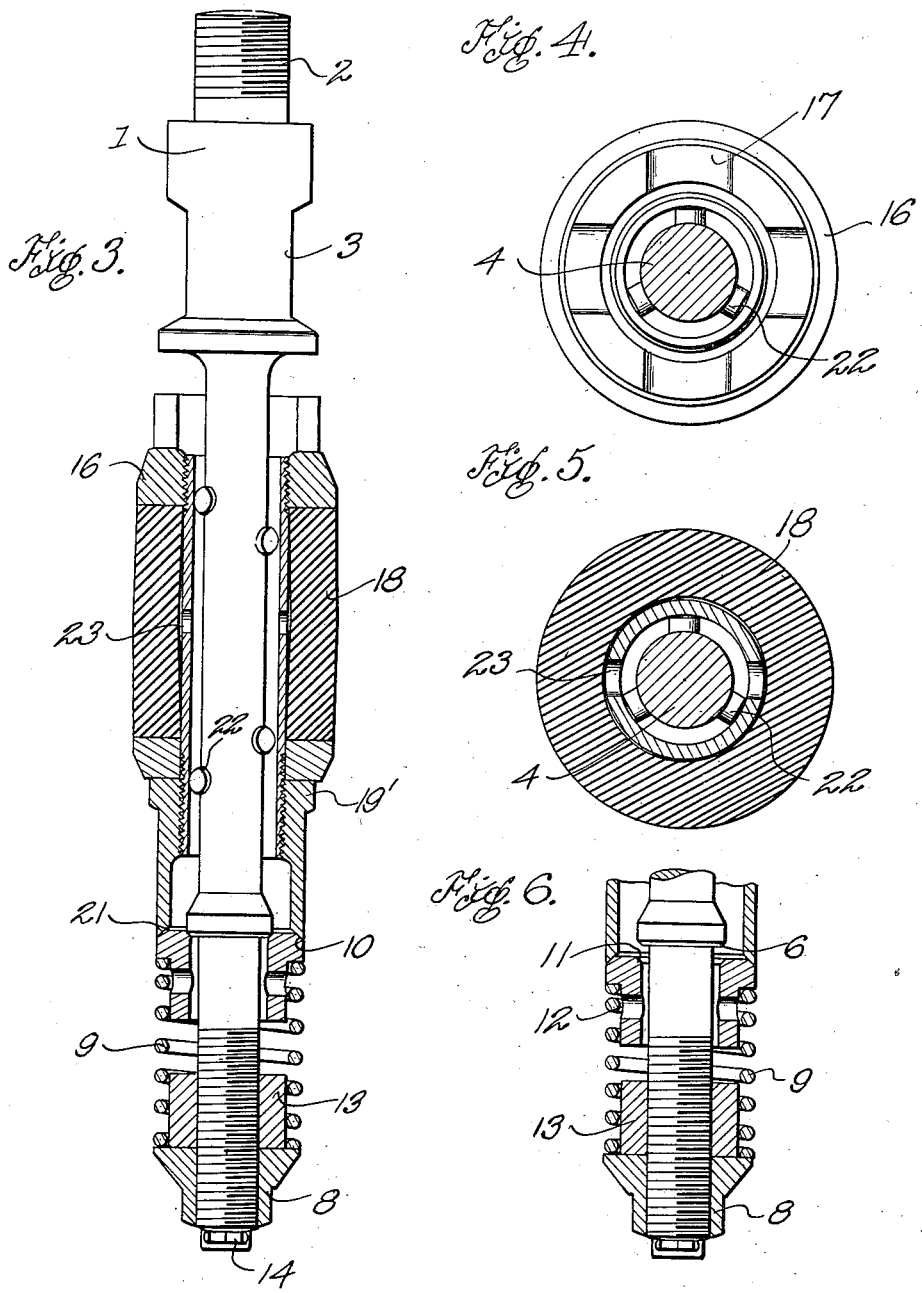
W. J. Carpenter
INVENTOR Patented Feb. 26, 1924.

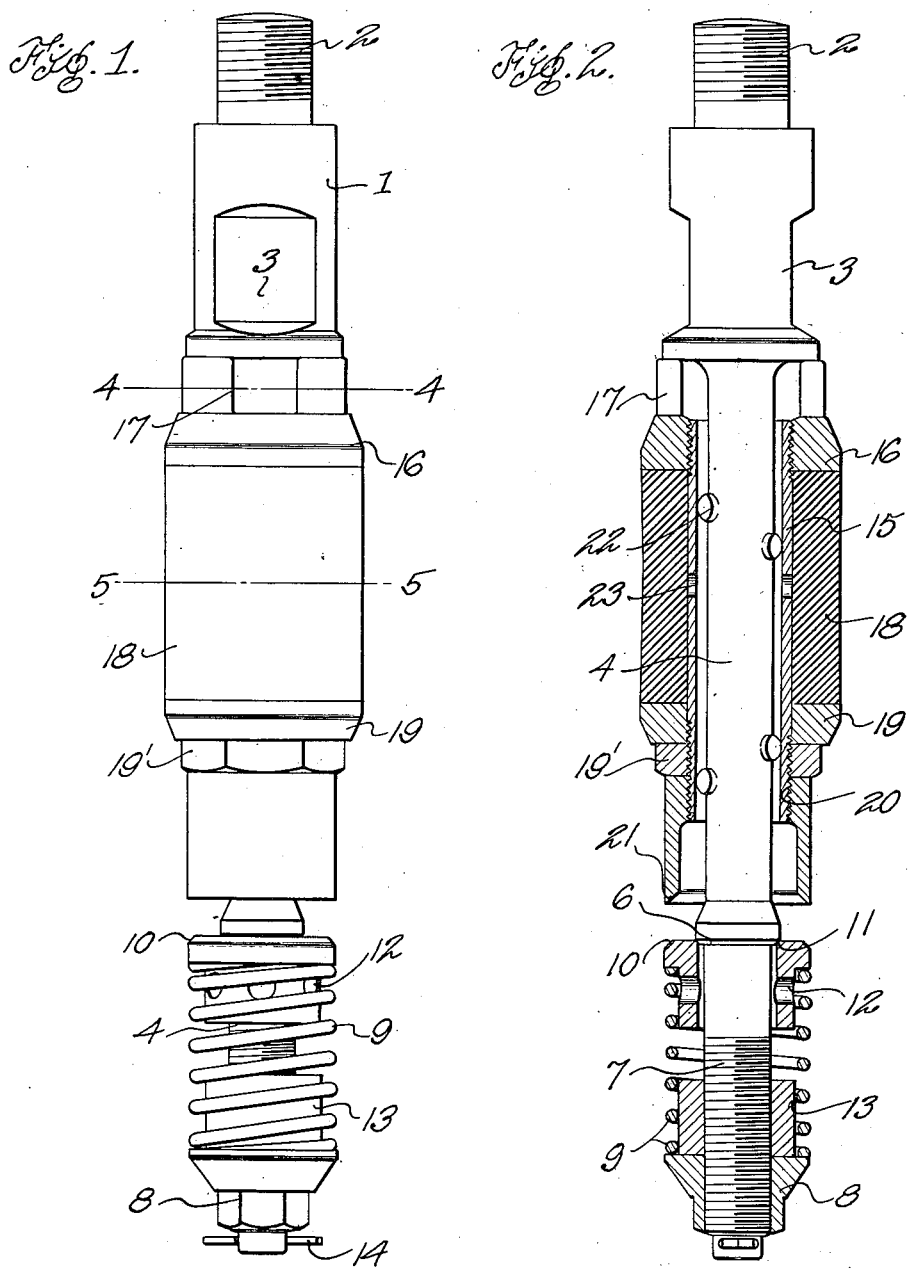

1,485,248

UNITED STATES PATENT OFFICE.

WILLIAM JAMES CARPENTER, OF GORMAN, TEXAS, ASSIGNOR OF ONE-HALF TO CREE AND COMPANY, OF GORMAN, TEXAS.

SWAB.

Application filed January 24, 1923. Serial No. 614,664.

REISSUED
MAY 11 1926

*To all whom it may concern:*

Be it known that I, WILLIAM J. CARPENTER, a citizen of the United States, residing at Gorman, in the county of Eastland and State of Texas, have invented new and useful Improvements in Swabs, of which the following is a specification.

This invention relates to a swab for use in oil wells and the like, the general object of the invention being to provide means whereby the upward movement of the swab will lift a certain amount of liquid by the expansion of a packing member, said member contracting on the downward stroke to permit the swab to move downwardly without friction.

Another object of the invention is to provide means for preventing overloading of the device on its upward stroke.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a longitudinal sectional view thereof showing the parts in one position.

Figure 3 is a similar view showing the parts in another position.

Figure 4 is a section on line 4—4 of Figure 1.

Figure 5 is a section on line 5—5 of Figure 1.

Figure 6 is a section on line 6—6 of Figure 1.

In these views 1 indicates the head of the swab which has a reduced threaded part 2 so that it can be fastened to a tool for permitting it to be placed in a well. The head is provided with the wrench receiving part 3. A stem 4 is connected with the lower part of the head and this stem has a valve 6 formed thereon intermediate its ends and its lower extremities screw threaded, as at 7, for receiving the nut 8 which supports the spring 9 for the valve 10, which is slidably mounted on the stem and which has a valve seat 11 therein for the valve 6. The valve 10 is provided with the holes 12 for permitting the fluid passing the valve 6 to escape. The threaded part of the stem also carries a nut 13 which acts as a safety nut to support the parts if the nut 8 should become loose. A pin 14 passes through a hole in the lower part of the stem to prevent the nuts from dropping off the same. A tube 15 surrounds the stem, said tube having a flange 16 at its upper end which is provided with the notches 17 for permitting the fluid to pass upwardly through the tube to pass into the well. A packing sleeve 18 of rubber or the like is held on the upper part of the tube by the washer 19 and nut 19', the nut engaging a screw threaded part 20 of the tube. This nut and washer hold the sleeve between the washer and the flange 16. The lower part of the sleeve carries the valve seat 21 for the valve 10. Pins 22 are carried by the stem 4 for centering the tube and the tube has holes 23 therein for permitting some of the fluid to pass through the same into the space between the tube and sleeve so as to expand the sleeve against the walls of the well.

From the above it will be seen that when the swab reaches the bottom of the well the pressure of the liquid will raise the tube and the parts carried thereby so that the liquid can pass by the valve 10 and through the tube and through the opening 17 and thus enter the space above the packing sleeve 18. Then when the swab is lifted the tube and the parts carried thereby will drop under the action of gravity and the weight of the liquid so as to close the valve 10 and some of the liquid escaping through the holes 23 will cause the sleeve 18 to expand against the walls of the well and thus prevent escape of the liquid in the well above the device. However, if there is too much liquid the valve 6 will be raised and the surplus liquid will escape through the holes 12. As soon as the quantity of liquid is reduced to that for which the spring 9 is adjusted by the nut 8, the valve 6 will close so that the rear of the liquid can be lifted out of the well. On the downward stroke the sleeve 18 will contract to its normal position as there will be no liquid to expand it.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A swab of the class described comprising a head, a stem connected therewith, a tubular member surrounding the stem, a packing member carried by the tubular member, a valve seat at the lower end of the tubular member, a valve slidably mounted on the stem, a spring carried by the stem for holding the valve upon its seat, a nut on the stem for adjusting the spring and means for expanding the packing member on the upward stroke by the pressure of the liquid being raised.

2. A swab of the class described comprising a head, a stem connected therewith, a tubular member surrounding the stem, a packing member carried by the tubular member, a valve seat at the lower end of the tubular member, a valve slidably mounted on the stem, a spring carried by the stem for holding the valve upon its seat, a nut on the stem for adjusting the spring, means for expanding the packing member on the upward stroke by the pressure of the liquid being raised and a relief valve carried by the stem for permitting any surplus liquid being lifted to escape until the weight of the liquid is equal to the strength of the spring.

3. A swab of the class described comprising a head, a stem connected therewith, a tubular member surrounding the stem, a packing member carried by the tubular member, a valve seat at the lower end of the tubular member, a valve slidably mounted on the stem, a spring carried by the stem for holding the valve upon its seat, a nut on the stem for adjusting the spring, means for expanding the packing member on the upward stroke by the pressure of the liquid being raised and a relief valve carried by the stem for permitting any surplus liquid being lifted to escape until the weight of the liquid is equal to the strength of the spring and a safety nut carried by the stem.

In testimony whereof I affix my signature.

WILLIAM JAMES CARPENTER.